US012744198B2

(12) United States Patent
Huang et al.

(10) Patent No.: US 12,744,198 B2
(45) Date of Patent: Sep. 22, 2026

(54) MEASUREMENT DEVICE AND ELECTRODE PLATE PRODUCTION SYSTEM

(71) Applicant: CONTEMPORARY AMPEREX TECHNOLOGY (HONG KONG) LIMITED, Hong Kong (CN)

(72) Inventors: Xiangqiang Huang, Ningde (CN); Yinyong Qiao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 763 days.

(21) Appl. No.: 18/128,882

(22) Filed: Mar. 30, 2023

(65) Prior Publication Data

US 2024/0047639 A1 Feb. 8, 2024

(30) Foreign Application Priority Data

Aug. 8, 2022 (CN) ......................... 202222063688.0

(51) Int. Cl.
*H01M 4/04* (2006.01)
*H01M 4/139* (2010.01)
*H01M 4/02* (2006.01)

(52) U.S. Cl.
CPC ......... *H01M 4/0435* (2013.01); *H01M 4/139* (2013.01); *H01M 2004/021* (2013.01)

(58) Field of Classification Search
CPC .............................. H01M 4/435; H01M 4/139
See application file for complete search history.

(56) References Cited

FOREIGN PATENT DOCUMENTS

| | | | | | |
|---|---|---|---|---|---|
| CN | 102539633 A | | 7/2012 | | |
| CN | 212113887 U | | 12/2020 | | |
| CN | 212287917 U | * | 1/2021 | | |
| CN | 215676789 U | * | 1/2022 | | |
| JP | 2004206818 A | * | 7/2004 | ........... | G11B 15/093 |

OTHER PUBLICATIONS

CN_212287917 Translation (Year: 2021).*
CN_215676789 Translation (Year: 2022).*
JP_2004206818 (Year: 2004).*
Extended European Search Report issued Dec. 4, 2023 in European Patent Application No. 23165903.8.

* cited by examiner

*Primary Examiner* — Jimmy Vo
(74) *Attorney, Agent, or Firm* — XSENSUS LLP

(57) ABSTRACT

The present application provides a measurement device and an electrode plate production system. The measurement device includes an unwinding mechanism, an adjustment mechanism, a measurement mechanism and a winding mechanism. The unwinding mechanism is configured to unwind a material tape. The adjustment mechanism is arranged downstream of the unwinding mechanism and configured to adjust a tensioning force of the material tape so that the material tape forms a tensioned area. The measurement mechanism is configured to measure the size of the tensioned area. The winding mechanism is arranged downstream of the adjustment mechanism and configured to wind up the material tape. The adjustment mechanism of the measurement device can adjust the tensioning force of the material tape and keep the material tape under a preset tensioning force. Measuring results of the measurement device can provide an accurate feedback on the size of the material tape.

20 Claims, 14 Drawing Sheets

MEASUREMENT DEVICE AND ELECTRODE PLATE PRODUCTION SYSTEM

CROSS-REFERENCE TO RELATED APPLICATION

This application claims priority to Chinese Patent Application No. 202222063688.0, entitled "MEASUREMENT DEVICE AND ELECTRODE PLATE PRODUCTION SYSTEM" filed on Aug. 8, 2022, which is incorporated herein by reference in its entirety.

TECHNICAL FIELD

The present application relates to the battery field, and in particular to a measurement device and an electrode plate production system.

BACKGROUND ART

Batteries are widely used in the field of new energy, such as electric vehicles and new-energy vehicles. New-energy vehicles and electric vehicles have become a new trend in development of the automotive industry. A battery cell includes an electrode assembly, and the electrode assembly is a component, where an electrochemical reaction occurs, in the battery cell. The electrode assembly is mainly formed by winding or stacking a positive electrode plate and a negative electrode plate. However, the yield in production of electrode plates at present is low.

SUMMARY

Embodiments of the present application are intended to provide a measurement device and an electrode plate production system, aiming to solve the problem of low yield in production of electrode plates in the prior art.

In a first aspect, embodiments of the present application provide a measurement device. The measurement device includes an unwinding mechanism, an adjustment mechanism, a measurement mechanism and a winding mechanism. The unwinding mechanism is configured to unwind a material tape; the adjustment mechanism is arranged downstream of the unwinding mechanism and configured to adjust a tensioning force of the material tape so that the material tape forms a tensioned area; the measurement mechanism is configured to measure the size of the tensioned area; and the winding mechanism is arranged downstream of the adjustment mechanism and configured to wind up the material tape.

In the above technical solution, the unwinding mechanism and the winding mechanism of the measurement device cooperate to achieve conveying of the material tape. The adjustment mechanism of the measurement device can adjust the tensioning force of the material tape and keep the material tape under a preset tensioning force, so that the material tape maintains a specific and constant amount of deformation to enable the measurement device to measure the size of the material tape more accurately. Measuring results of the measurement device can provide an accurate feedback on the size of the material tape, which is conducive to controlling the production quality of the material tape accordingly, thereby improving the yield of the material tape.

As an alternative technical solution of the embodiments of the present application, the adjustment mechanism includes a first drive roller and a second drive roller, the material tape is wound around the first drive roller and the second drive roller, and the part of the material tape located between the first drive roller and the second drive roller forms the tensioned area.

In the above technical solution, both the first drive roller and the second drive roller can drive the material tape to move, and the tensioning force of the material tape can be adjusted by adjusting material tape conveying speeds of the first drive roller and the second drive roller. For example, the first drive roller and the second drive roller have the same roller diameter, the first drive roller can backwards convey the material tape unwound by the unwinding mechanism, and the second drive roller can convey the material tape conveyed by the first drive roller further toward the winding mechanism. If a rotational speed of the second drive roller is greater than a rotational speed of the first drive roller, the second drive roller can convey the material tape to the winding mechanism faster, causing the amount of material tape fed to the second drive roller by the first drive roller to be less than the amount that can be conveyed by the second drive roller, and the part of the material tape located between the first drive roller and the second drive roller is tensioned to form the tensioned area. As a rotational speed difference between the second drive roller and the first drive roller increases, the material tape becomes tighter, and is subjected to a higher tensioning force. Accordingly, the first drive roller and the second drive roller can adjust the tensioning force applied to the material tape and keep the material tape under a preset tensioning force, thus the measurement device measures the size of the material tape more accurately.

As an alternative technical solution of the embodiments of the present application, the measurement device further includes a detection unit configured to detect a tensioning force of the tensioned area, and the first drive roller and the second drive roller respond to detection results of the detection unit.

In the above technical solution, the detection unit is provided to detect the tensioning force of the tensioned area, the first drive roller and the second drive roller may further adjust the tensioning force of the tensioned area according to the detection results of the detection unit, keeping the tensioning force of the tensioned area below the preset tensioning force. In this way, the detection unit, the first drive roller and the second drive roller realize feedback adjustment, which helps to improve the accuracy of the measurement mechanism in detecting the material tape.

As an alternative technical solution of the embodiments of the present application, the measurement device includes a first tension roller, the material tape being sequentially wound around the first drive roller, the first tension roller, and the second drive roller; and the detection unit includes a pressure sensor and a calculation unit, the pressure sensor being configured to measure a pressure applied to the first tension roller by the material tape and being communicatively connected to the calculation unit, and the calculation unit being configured to calculate the tensioning force of the material tape according to detection results of the pressure sensor.

In the above technical solution, the pressure sensor is provided to measure the pressure applied to the first tension roller by the material tape. The pressure applied by the material tape on the first tension roller may be considered as a resultant force of two component forces (tensioning forces) of the material tape on both sides of the tension roller. Accordingly, the calculation unit may calculate the component forces (tensioning forces) on the basis of the pressure applied to the first tension roller by the material tape and an angle between each of two component forces and the pressure. As the detection unit is used for measuring the tensioning force, the measuring results are accurate and the cost is low.

As an alternative technical solution of the embodiments of the present application, the measurement device includes a second tension roller, the material tape being sequentially wound around the first drive roller, the second tension roller, and the second drive roller; and the measurement mechanism and the second tension roller are arranged opposite each other on two sides in a thickness direction of the material tape so that the measurement mechanism measures the size of the part of the material tape wound on the second tension roller.

In the above technical solution, the second tension roller can support the material tape, the measurement mechanism measures the part wound on the second tension roller, so that the material tape is less prone to shaking, making the measuring results more accurate, which is conducive to controlling the production quality of the material tape accordingly, thereby improving the yield of the material tape.

As an alternative technical solution of the embodiments of the present application, the adjustment mechanism further includes a first pinch roller, the first pinch roller and the first drive roller being arranged on two sides in a thickness direction of the material tape, and the first pinch roller and the first drive roller cooperating to convey the material tape; and/or the adjustment mechanism further includes a second pinch roller, the second pinch roller and the second drive roller being arranged on two sides in the thickness direction of the material tape, and the second pinch roller and the second drive roller cooperating to convey the material tape.

In the above technical solution, the first pinch roller is provided to cooperate with the first drive roller to convey the material tape, and the material tape is clamped between the first pinch roller and the first drive roller, so that slipping of the material tape can be avoided. The second pinch roller is provided to cooperate with the second drive roller to convey the material tape, and the material tape is clamped between the second pinch roller and the second drive roller, so that slipping of the material tape can be avoided.

As an alternative technical solution of the embodiments of the present application, the second drive roller is communicatively connected to the measurement mechanism, and the measurement mechanism measures the size of the tensioned area in response to the second drive roller.

In the above technical solution, when the second drive roller starts to move, the measurement mechanism also starts to measure the size of the tensioned area in response to the movement of the second drive roller, so that there is no need to start the measurement mechanism separately, and the degree of automation of the measurement device is increased.

As an alternative technical solution of the embodiments of the present application, the measurement device further includes a detection unit configured to detect a tensioning force of the tensioned area, and the adjustment mechanism responds to detection results of the detection unit.

In the above technical solution, the detection unit is provided to detect the tensioning force of the tensioned area, the adjustment mechanism may further adjust the tensioning force of the tensioned area according to the detection results of the detection unit, keeping the tensioning force of the tensioned area below the preset tensioning force. In this way, the detection unit and the adjustment mechanism realize feedback adjustment, which helps to improve the accuracy of the measurement mechanism in detecting the material tape.

As an alternative technical solution of the embodiments of the present application, the unwinding mechanism includes a feed roller and a driving mechanism, the material tape being wound around the feed roller; and the driving mechanism being connected to the feed roller and configured to drive the feed roller to rotate to unwind the material tape.

In the above technical solution, the driving mechanism is provided to drive the feed roller to rotate to achieve active unwinding of the material tape.

As an alternative technical solution of the embodiments of the present application, the adjustment mechanism includes a first drive roller, the material tape is wound on the first drive roller, and the part of the material tape located between the first drive roller and the feed roller forms the tensioned area.

In the above technical solution, the driving mechanism can drive the feed roller to unwind, the first drive roller can drive the material tape to move, and the tensioning force of the material tape can be adjusted by adjusting an unwinding speed of the feed roller and a material tape conveying speed of the first drive roller. For example, the feed roller and the first drive roller have the same roller diameter, the feed roller can unwind the material tape, and the first drive roller can convey the unwound material tape further toward the winding mechanism. If a rotational speed of the first drive roller is greater than a rotational speed of the feed roller, the first drive roller can convey the material tape to the winding mechanism faster, causing the amount of material tape unwound by the feed roller to be less than the amount that can be conveyed by the first drive roller, and the part of the material tape located between the feed roller and the first drive roller is tensioned to form the tensioned area. As a rotational speed difference between the first drive roller and the feed roller increases, the material tape becomes tighter, and is subjected to a higher tensioning force. Accordingly, the first drive roller can adjust the tensioning force of the material tape and keep the material tape under a preset tensioning force, thus the measurement device measures the size of the material tape more accurately.

As an alternative technical solution of the embodiments of the present application, the measurement device further includes a detection unit configured to detect a tensioning force of the tensioned area, and the first drive roller and the driving mechanism respond to detection results of the detection unit.

In the above technical solution, the detection unit is provided to detect the tensioning force of the tensioned area, the first drive roller and the driving mechanism may further adjust the tensioning force of the tensioned area according to the detection results of the detection unit, keeping the tensioning force of the tensioned area below the preset tensioning force. In this way, the detection unit, the first drive roller and the driving mechanism realize feedback adjustment, which helps to improve the accuracy of the measurement mechanism in detecting the material tape.

As an alternative technical solution of the embodiments of the present application, the measurement device includes a first tension roller, the material tape being sequentially wound around the first tension roller and the first drive roller; and the detection unit includes a pressure sensor and a calculation unit, the pressure sensor being configured to measure a pressure applied to the first tension roller by the material tape and being communicatively connected to the calculation unit, and the calculation unit being configured to calculate the tensioning force of the material tape according to detection results of the pressure sensor.

In the above technical solution, the pressure sensor is provided to measure the pressure applied to the first tension roller by the material tape. The pressure applied by the material tape on the first tension roller may be considered as a resultant force of two component forces (tensioning forces) of the material tape on both sides of the tension roller. Accordingly, the calculation unit may calculate the component forces (tensioning forces) on the basis of the pressure applied to the first tension roller by the material tape and an angle between each of two component forces and the pressure. As the detection unit is used for measuring the tensioning force, the measuring results are accurate and the cost is low.

As an alternative technical solution of the embodiments of the present application, the measurement device includes a second tension roller, the material tape being sequentially wound around the second tension roller and the first drive roller; and the measurement mechanism and the second tension roller are arranged opposite each other on two sides in a thickness direction of the material tape so that the measurement mechanism measures the size of the part of the material tape wound on the second tension roller.

In the above technical solution, the second tension roller can support the material tape, the measurement mechanism measures the part wound on the second tension roller, so that the material tape is less prone to shaking, making the measuring results more accurate, which is conducive to controlling the production quality of the material tape accordingly, thereby improving the yield of the material tape.

As an alternative technical solution of the embodiments of the present application, the measurement mechanism is an industrial camera.

In the above technical solution, the industrial camera is chosen as the measurement mechanism, which is accurate and reliable, and does not need to touch the material tape when measuring, so it will not damage the material tape.

In a second aspect, embodiments of the present application further provide an electrode plate production system. The electrode plate production system includes a provision device and the measurement device described above. The provision device is configured to provide an electrode plate; and the measurement mechanism is configured to measure the size of the tensioned area.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
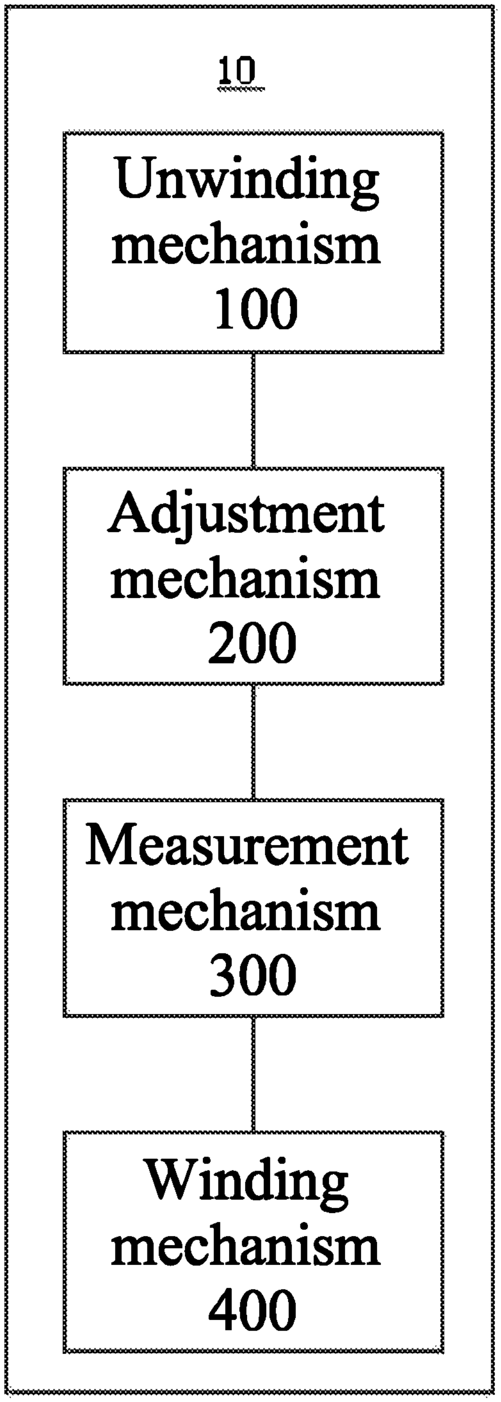
FIG. 1 is a block diagram of a measurement device according to some embodiments of the present application.

List of reference numerals: 10—measurement device; 100—unwinding mechanism; 110—feed roller; 120—driving mechanism; 200—adjustment mechanism; 210—first drive roller; 220—second drive roller; 230—first pinch roller; 240—second pinch roller; 300—measurement mechanism; 400—winding mechanism; 500—detection unit; 510—pressure sensor; 520—calculation unit; 600—first tension roller; 700—second tension roller; 800—material tape; 810—tensioned area; 20—electrode plate production system; and 21—provision device;

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs; The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated apparatus are merely illustrative and should not be construed to limit the present application in any way.

"A plurality of" appearing in the present application means two or more (including two).

In the present application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, etc., which is not limited in the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells, which also will not be limited in the embodiments of the present application.

A battery mentioned in the embodiments of the present application refers to a single physical module including one or more battery cells to provide a high voltage and capacity. For example, the battery mentioned in the present application may include a battery module, a battery pack, etc. The battery generally includes a case for packaging one or more battery cells. The case can prevent liquid or other foreign matters from affecting charging or discharging of a battery cell.

The battery cell includes an electrode assembly and an electrolytic solution. The electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode plate includes a negative electrode current collector and a negative electrode active material layer. A surface of the negative electrode current collector is coated with the negative electrode active material layer, the negative electrode current collector that is not coated with the negative electrode active material layer protrudes from the negative electrode current collector coated with the negative electrode active material layer, and the negative electrode current collector that is not coated with the negative electrode active material layer is used as a negative electrode tab. The negative current collector may be made of copper, and the negative electrode active material may be carbon, silicon, etc. In order to ensure that no fusing occurs when a large current passes, a plurality of positive tabs are provided and are stacked together, and a plurality of negative tabs are provided and are stacked together. The separator may be made of PP (polypropylene), PE (polyethylene), etc. In addition, the electrode assembly may be of a wound structure or a laminated structure, which will not be limited in the embodiments of the present application.

At present, from the perspective of the development of the market situation, batteries are used more and more widely. The batteries are not only used in energy storage power systems such as hydroelectric power plants, thermal power plants, wind power plants and solar power plants, but also widely used in electric transportation means such as electric bicycles, electric motorcycles and electric vehicles and in many fields such as military equipment and aerospace. With the continuous expansion of the application field of batteries, the market demand for the batteries is also expanding.

A battery cell includes an electrode assembly, and the electrode assembly is a component, where an electrochemical reaction occurs, in the battery cell. The electrode assembly is mainly formed by winding or stacking a positive electrode plate and a negative electrode plate. However, the yield in production of electrode plates at present is low.

The inventors further researched and found that in the electrode plate production process, it is necessary to measure outline dimensions of electrode plates periodically and regulate production equipment according to measuring results in order to control the quality of the electrode plates. A manual measurement method is stilled used for measurement at present, and the specific operation is as follows: laying an electrode plate across a stainless steel measuring platform, straightening the electrode plate, fixing both ends of the electrode plate with an adhesive tape, and then using a steel measuring scale with an accuracy of 1 mm to measure the total length of the electrode plate, and a plastic measuring scale with an accuracy of 0.5 mm to measure a width of the electrode plate, a width of a film area, a height of a tab, a width of the tab, a distance between tabs and other outline dimensions. However, the tensioning force of the electrode plate cannot be quantified when the electrode plate is manually tensioned, the measured values of the total length of the electrode plate under different tensioning conditions are different, and this deviation value may affect the final measuring result, leading to a failure in accurate measurement of the size of the electrode plate. The production quality of electrode plates is controlled according to the measuring result of this method, resulting in a low yield of the electrode plates, which may seriously lead to rejects in batches.

In view of this, embodiments of the present application provide a measurement device, in which the adjustment mechanism is provided to adjust a tensioning force of a material tape and keep the material tape under a preset tensioning force, so that the material tape maintains a specific and constant amount of deformation, and thus the measurement device measures the size of the material tape more accurately. Measuring results of the measurement device can provide an accurate feedback on the size of the material tape, which is conducive to controlling the production quality of the material tape accordingly, thereby improving the yield of the material tape.

The technical solutions described in the embodiments of the present application are applicable to dimensional measurement of strip-like structures, such as electrode plates, belts, and ribbons.

Figure 2:
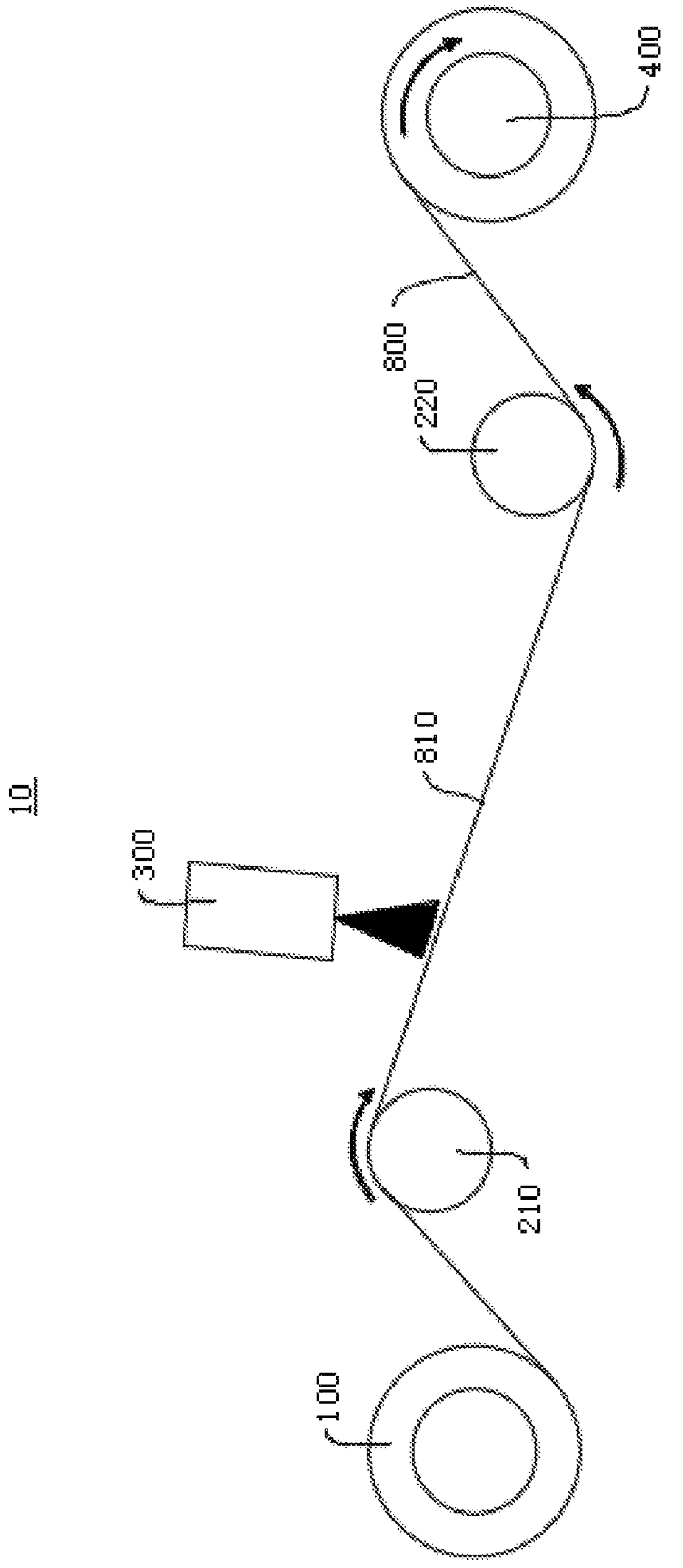
FIG. 2 is a schematic diagram of a measurement device according to some embodiments of the present application.

Referring to FIGS. 1 and 2, FIG. 1 is a block diagram of a measurement device 10 according to some embodiments of the present application. FIG. 2 is a schematic diagram of a measurement device 10 according to some embodiments of the present application. In some embodiments, the embodiments of the present application provide a measurement device 10. The measurement device 10 includes an unwinding mechanism 100, an adjustment mechanism 200, a measurement mechanism 300 and a winding mechanism 400. The unwinding mechanism 100 is configured to unwind a material tape 800. The adjustment mechanism 200 is arranged downstream of the unwinding mechanism 100. The adjustment mechanism 200 is configured to adjust a tensioning force of the material tape 800 so that the material tape 800 forms a tensioned area 810. The measurement mechanism 300 is configured to measure the size of the tensioned area 810. The winding mechanism 400 is arranged downstream of the adjustment mechanism 200. The winding mechanism 400 is configured to wind up the material tape 800.

The unwinding mechanism 100 is a mechanism for releasing the wound material tape 800. The unwinding mechanism 100 may achieve active unwinding or passive unwinding. The passive unwinding may be achieved with the aid of the adjustment mechanism 200.

Corresponding to the unwinding mechanism 100, the winding mechanism 400 is a mechanism configured to wind up the material tape 800. The winding mechanism 400 includes a winding roller and a driving unit, the driving unit being connected to the winding roller and configured to drive the winding roller to rotate so as to wind up the material tape 800 on the winding roller.

The adjustment mechanism 200 is a mechanism configured to adjust the tensioning force of the material tape 800. When the measurement mechanism 300 measures, the tensioning force of the material tape 800 is adjusted to a preset tensioning force by the adjustment mechanism 200, so that the material tape 800 maintains a specific and constant amount of deformation, improving the accuracy of the measurement mechanism 300.

The tensioned area 810 is the part of the material tape 800 where the tensioning force is adjusted by the adjustment mechanism 200, and the tensioning force of the tensioned area 810 is below the preset tensioning force. Since the tensioning force of the part of the material tape 800 that is adjusted by the adjustment mechanism 200 may be different from the tensioning force of other parts, the tensioned area 810 is used to refer specifically to the part of the material tape where the tensioning force is adjusted by the adjustment mechanism 200.

The measurement mechanism 300 is a mechanism having a measuring function. The measurement mechanism 300 is capable of measuring the size of the tensioned area 810. For example, if the material tape 800 refers to an electrode plate, the measurement mechanism 300 can measure the overall length of the electrode plate, a width of the electrode plate, a width of a film area, a height of a tab, a width of the tab, a distance between tabs, and other outline dimensions.

"The adjustment mechanism 200 is arranged downstream of the unwinding mechanism 100 and the winding mechanism 400 is arranged downstream of the adjustment mechanism 200" means that the material tape 800 is unwound by the unwinding mechanism 100, and is wound up by the winding mechanism 400 after passing through the adjustment mechanism 200. It corresponds to the arrangement positions of the adjustment mechanism 200 and the winding mechanism 400.

The unwinding mechanism 100 and the winding mechanism 400 of the measurement device 10 cooperate to achieve conveying of the material tape 800. The adjustment mechanism 200 of the measurement device 10 can adjust the tensioning force of the material tape 800 and keep the material tape 800 under a preset tensioning force, so that the material tape 800 maintains a specific and constant amount of deformation, and thus the measurement mechanism 300 measures the size of the material tape 800 more accurately. Measuring results of the measurement device 10 can provide an accurate feedback on the size of the material tape 800, which is conducive to controlling the production quality of the material tape 800 accordingly, thereby improving the yield of the material tape 800.

Referring to FIGS. 1 and 2, in some embodiments, the adjustment mechanism 200 includes a first drive roller 210 and a second drive roller 220. The material tape 800 is wound around the first drive roller 210 and the second drive roller 220, and the part of the material tape 800 located between the first drive roller 210 and the second drive roller 220 forms the tensioned area 810.

The first drive roller 210 and the second drive roller 220 are drive rollers capable of rotating actively, and the first drive roller 210 and the second drive roller 220 can drive the material tape 800 to move when rotating (arrows in the figure identify the direction of rotation of the structure capable of rotating actively). Referring to FIG. 2, the first drive roller 210 is located downstream of the unwinding mechanism 100 and the second drive roller 220 is located downstream of the first drive roller 210. The material tape 800 unwound by the unwinding mechanism 100 is sequentially wound around the first drive roller 210 and the second drive roller 220, and wound up by the winding mechanism 400.

Taking the first drive roller 210 as an example, the first drive roller 210 includes a roller body and a driving member, the roller body is connected to the driving member, the driving member is configured to drive the roller body to rotate, and the material tape 800 is wound on the roller body. When the driving member moves, the roller body rotates to drive the material tape 800 to move. The driving member may be a motor, an internal combustion engine, etc. The second drive roller 220 has a structure the same as that of the first drive roller 210, which will not be repeated here.

Both the first drive roller 210 and the second drive roller 220 can drive the material tape 800 to move, and the tensioning force of the material tape 800 can be adjusted by adjusting material tape 800 conveying speeds of the first drive roller 210 and the second drive roller 220. For example, the first drive roller 210 and the second drive roller 220 have the same roller diameter, the first drive roller 210 can backwards convey the material tape 800 unwound by the unwinding mechanism 100, and the second drive roller 220 can convey the material tape 800 conveyed by the first drive roller 210 further toward the winding mechanism 400. If a rotational speed of the second drive roller 220 is greater than a rotational speed of the first drive roller 210, the second drive roller 220 can convey the material tape 800 to the winding mechanism 400 faster, causing the amount of material tape 800 fed to the second drive roller 220 by the first drive roller 210 to be less than the amount that can be conveyed by the second drive roller 220, and the part of the material tape 800 located between the first drive roller 210 and the second drive roller 220 is tensioned to form the tensioned area 810. As a rotational speed difference between the second drive roller 220 and the first drive roller 210 increases, the material tape 800 becomes tighter, and the material tape 800 is subjected to a higher tensioning force. Accordingly, the first drive roller 210 and the second drive roller 220 can adjust the tensioning force applied to the material tape 800 and keep the material tape 800 under a preset tensioning force, thus the measurement mechanism 300 measures the size of the material tape 800 more accurately.

Figure 3:
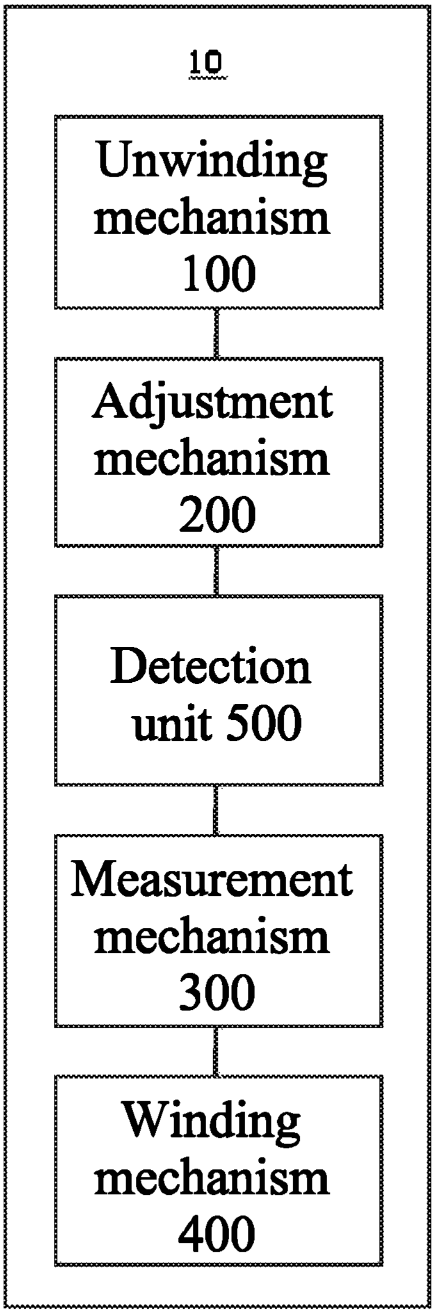
FIG. 3 is a block diagram of a measurement device (including a detection unit) according to some embodiments of the present application.

Referring to FIG. 3, FIG. 3 is a block diagram of a measurement device 10 (including a detection unit 500) according to some embodiments of the present application. In some embodiments, the measurement device 10 further includes the detection unit 500. The detection unit 500 is configured to detect a tensioning force in the tensioned area 810. The first drive roller 210 and the second drive roller 220 respond to detection results of the detection unit 500.

The detection unit 500 is a component for detecting the tensioning force of the tensioned area 810. The detection unit 500 may be communicatively connected to the first drive roller 210 and the second drive roller 220, including the detection unit 500 being connected to the first drive roller 210 and the second drive roller 220 by means of a wired connection such as a wire and a network cable, and also including the detection unit 500 being connected to the first drive roller 210 and the second drive roller 220 by means of a wireless connection such as Bluetooth and a wireless network. The communication connection may refer to that the detection unit 500 is directly connected to the first drive roller 210 and the second drive roller 220 or that the detection unit 500 is indirectly connected to the first drive roller 210 and the second drive roller 220 through some intermediate component. For example, the intermediate component may be a controller. The detection unit 500 is electrically connected to the controller, the controller is electrically connected to the first drive roller 210 and the second drive roller 220, the controller receives the detection results from the detection unit 500 and controls the first drive roller 210 and the second drive roller 220 to adjust the tensioning force of the tensioned area 810 according to the detection results.

"The first drive roller 210 and the second drive roller 220 respond to detection results of the detection unit 500" means that the first drive roller 210 and the second drive roller 220 adjust the tensioning force of the tensioned area 810 according to the detection results of the detection unit 500. The first drive roller 210 and the second drive roller 220 may be controlled by the controller to regulate the tensioning force as described above, or may be controlled directly by the detection unit 500 to regulate the tensioning force.

The detection unit 500 is provided to detect the tensioning force of the tensioned area 810, the first drive roller 210 and the second drive roller 220 may further adjust the tensioning force of the tensioned area 810 according to the detection results of the detection unit 500, keeping the tensioning force of the tensioned area 810 below the preset tensioning force. In this way, the detection unit 500, the first drive roller 210 and the second drive roller 220 realize feedback adjustment, which helps to improve the accuracy of the measurement mechanism 300 in detecting the material tape 800.

Figure 4:
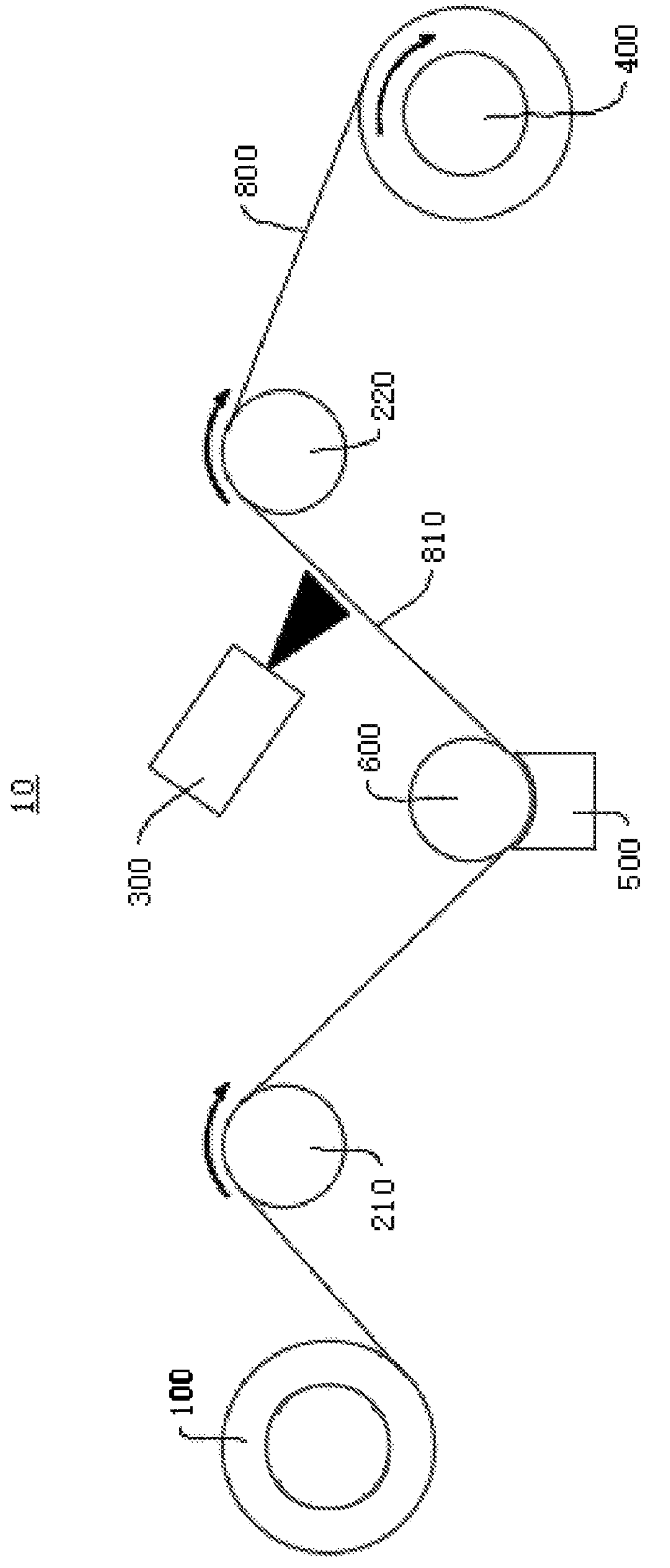
FIG. 4 is a schematic diagram of a measurement device (including a detection unit) according to some embodiments of the present application.
Figure 5:
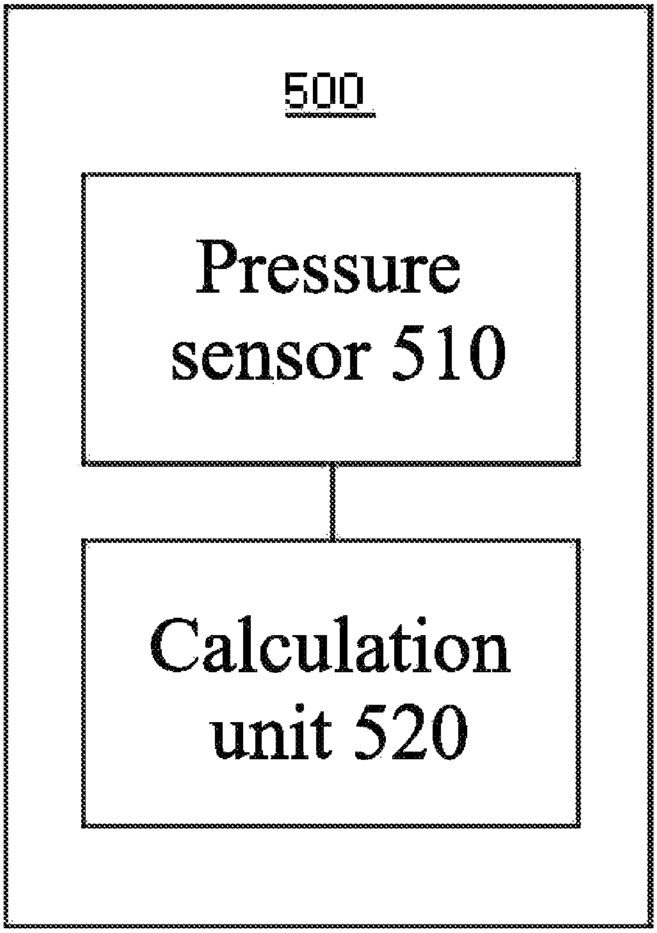
FIG. 5 is a block diagram of a detection unit according to some embodiments of the present application.
Figure 6:
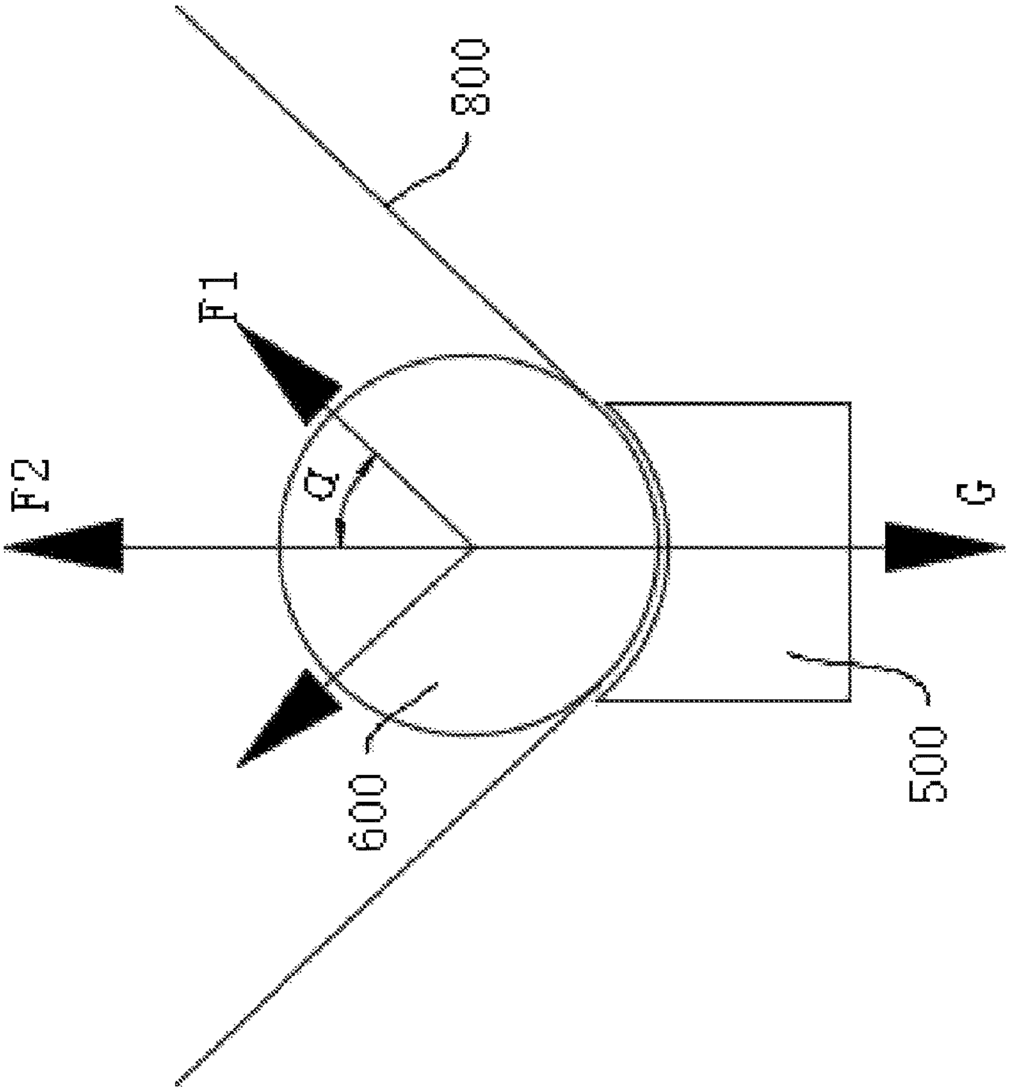
FIG. 6 is a force analysis diagram of a first tension roller according to some embodiments of the present application.

Referring to FIGS. 4, 5 and 6, FIG. 4 is a schematic diagram of a measurement device 10 (including a detection unit 500) according to some embodiments of the present application. FIG. 5 is a block diagram of a detection unit 500 according to some embodiments of the present application. FIG. 6 is a force analysis diagram of a first tension roller 600 according to some embodiments of the present application. In some embodiments, the measurement device 10 includes a first tension roller 600, the material tape 800 being sequentially wound around the first drive roller 210, the first tension roller 600 and the second drive roller 220. The detection unit 500 includes a pressure sensor 510 and a calculation unit 520. The pressure sensor 510 is configured to measure a pressure applied to the first tension roller 600 by the material tape 800. The pressure sensor 510 is communicatively connected to the calculation unit 520. The calculation unit 520 is configured to calculate the tensioning force of the material tape 800 according to detection results of the pressure sensor 510.

The first tension roller 600 is a roller structure for tensioning the material tape 800. The first tension roller 600 is located between the first drive roller 210 and the second drive roller 220 along a conveying direction of the material tape 800, so that the material tape 800 can be sequentially wound around the first drive roller 210, the first tension roller 600 and the second drive roller 220.

The pressure sensor 510 is a device or apparatus that can sense a pressure signal and can convert the pressure signal into a usable electrical signal according to a certain law. The pressure sensor 510 can measure the applied pressure. For example, as shown in FIG. 6, the pressure sensor 510 is arranged on a seat of the first tension roller 600, and the seat of the first tension roller 600 can support the first tension roller 600 to withstand gravity of the first tension roller 600 (indicated as G shown in FIG. 6). The material tape 800 is wound on the first tension roller 600 and applies an upward pressure (indicated as F2 shown in FIG. 6) on the first tension roller 600 to cancel part of the gravitational force. The pressure sensor 510 may detect the force on the seat (which is assumed to be N) and calculate the pressure ($F2=G-N$) applied on the first tension roller 600 by the material tape 800 based on the gravity of the first tension roller 600. Based on the pressure applied on the first tension roller 600 by the material tape 800, the tensioning force of the tensioned area 810 may be calculated (the tensioning force of the tensioned area 810 is indicated as F1 shown in FIG. 6, where F1=F2/2 cos α). For another example, the pressure sensor 510 may be arranged on the roller surface of the first tension roller 600, so that the pressure sensor 510 can directly measure the pressure applied to the first tension roller 600 by the material tape 800.

The calculation unit 520 is a component with information processing and program operation. For example, the computing unit 520 may be a CPU (Central Processing Unit), a PLC (Programmable Logic Controller), an ECU (Electronic Control Unit), etc. The calculation unit 520 may be communicatively connected to the first drive roller 210 and the second drive roller 220. The calculation unit 520 may also be communicatively connected to the controller, which is then communicatively connected to the first drive roller 210 and the second drive roller 220 through the controller.

The pressure sensor 510 is provided to measure the pressure applied to the first tension roller 600 by the material tape 800. The pressure applied on the first tension roller 600 by the material tape 800 may be considered as a resultant force of two component forces (tensioning forces) of the material tape 800 on both sides of the tension roller. Accordingly, the calculation unit 520 may calculate the component forces (tensioning forces) on the basis of the pressure applied to the first tension roller 600 by the material tape 800 and an angle between each of two component forces and the pressure. As the detection unit 500 is used for measuring the tensioning force, the measuring results are accurate and the cost is low.

Figure 7:
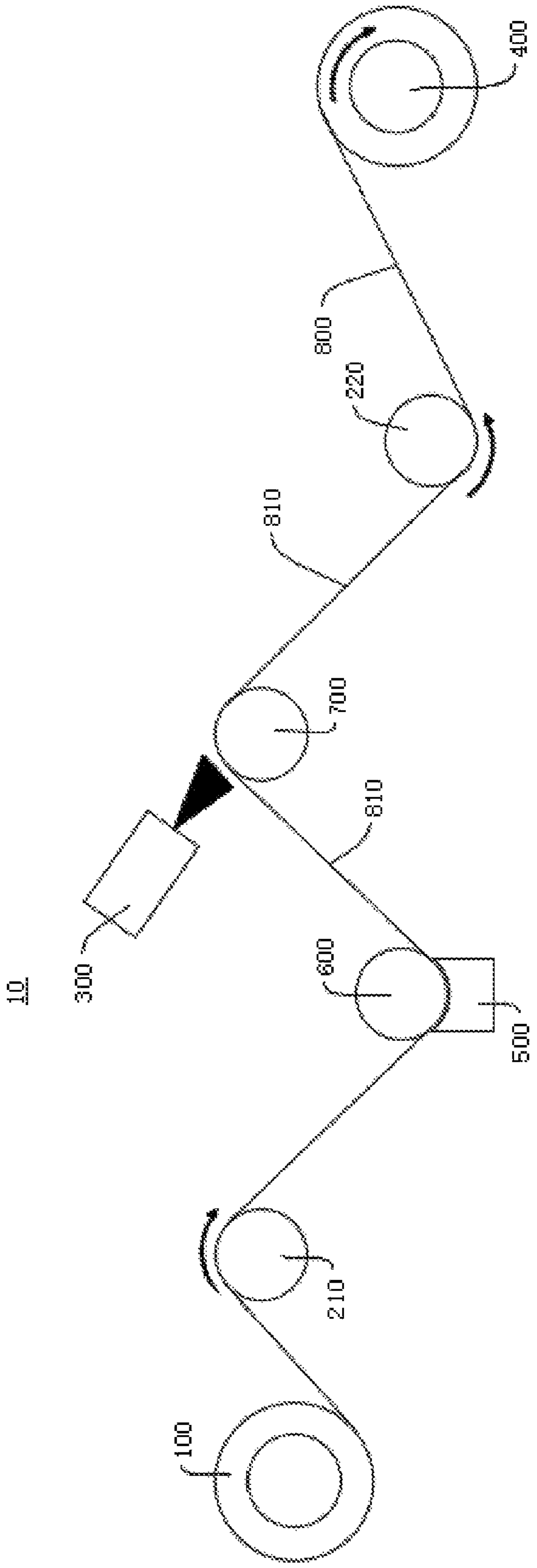
FIG. 7 is a schematic diagram of a measurement device (including a second tension roller) according to some embodiments of the present application.

Referring to FIG. 7, FIG. 7 is a schematic diagram of a measurement device 10 (including a second tension roller 700) according to some embodiments of the present application. In some embodiments, the measurement device 10 includes the second tension roller 700, the material tape 800 being sequentially wound around the first drive roller 210, the second tension roller 700 and the second drive roller 220. The measurement mechanism 300 and the second tension roller 700 are arranged opposite each other on two sides in a thickness direction of the material tape 800 so that the measurement mechanism 300 measures the size of the part of the material tape 800 wound on the second tension roller 700.

The second tension roller 700 is a roller structure for tensioning the material tape 800. Along a conveying direction of the material tape 800, the second tension roller 700 is located between the first drive roller 210 and the second drive roller 220, so that the material tape 800 can be sequentially wound around the first drive roller 210, the second tension roller 700 and the second drive roller 220.

Both the first tension roller 600 and the second tension roller 700 are located between the first drive roller 210 and the second drive roller 220 along the conveying direction of the material tape 800. The order of the first tension roller 600 and the second tension roller 700 is not limited. The first tension roller 600 may be located between the first drive roller 210 and the second tension roller 700, or between the second drive roller 220 and the second tension roller 700. As shown in FIG. 7, the first tension roller 600 is located downstream of the first drive roller 210 and upstream of the second tension roller 700. The material tape 800 is sequentially wound around the first drive roller 210, the first tension roller 600, the second tension roller 700 and the second drive roller 220.

The second tension roller 700 can support the material tape 800, the measurement mechanism 300 measures the part wound on the second tension roller 700, so that the material tape 800 is less prone to shaking, making the measuring results more accurate, which is conducive to controlling the production quality of the material tape 800 accordingly, thereby improving the yield of the material tape 800.

Figure 8:
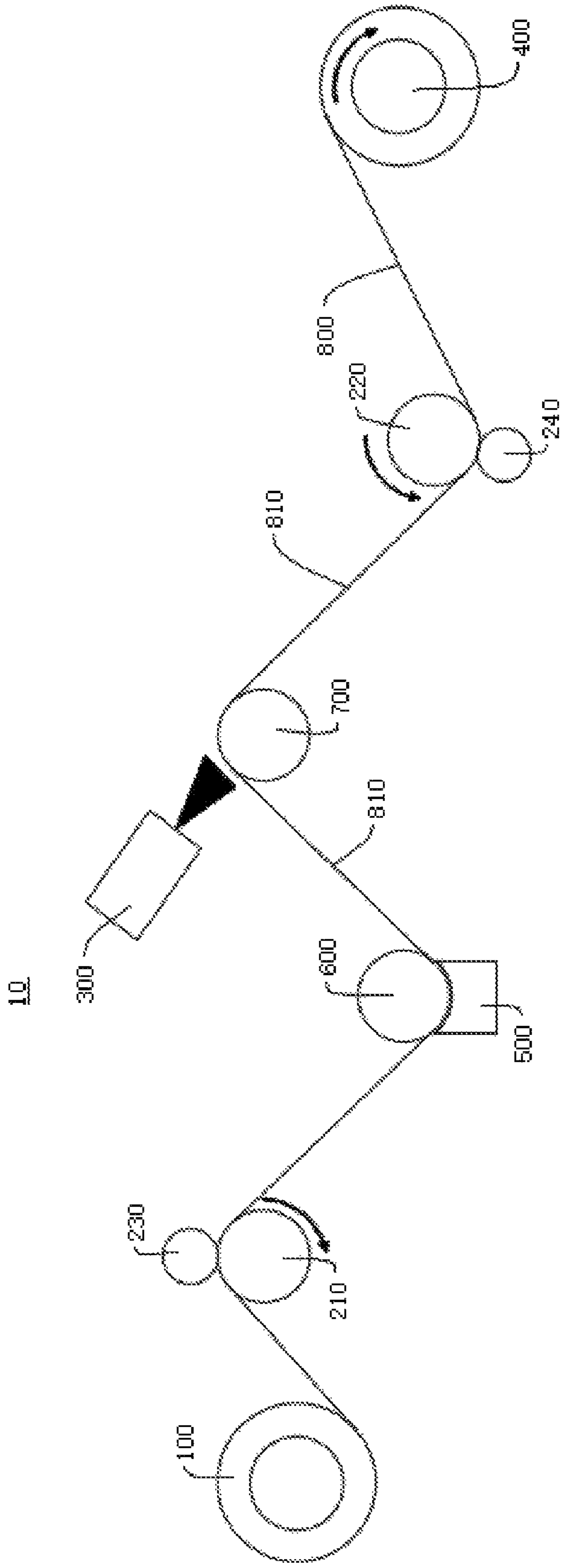
FIG. 8 is a schematic diagram of a measurement device (including a first pinch roller and a second pinch roller) according to some embodiments of the present application.

Referring to FIG. 8, FIG. 8 is a schematic diagram of a measurement device 10 (including a first pinch roller 230 and a second pinch roller 240) according to some embodiments of the present application. In some embodiments, the adjustment mechanism 200 further includes the first pinch roller 230, and the first pinch roller 230 and the first drive roller 210 are arranged on both sides of the material tape 800 along a thickness direction of the material tape 800. The first pinch roller 230 and the first drive roller 210 cooperate to convey the material tape 800. Additionally or alternatively, the adjustment mechanism 200 further includes the second pinch roller 240, the second pinch roller 240 and the second drive roller 220 being arranged on both sides of the material tape 800, in the thickness direction of the material tape 800. The second pinch roller 240 and the second drive roller 220 cooperate to convey the material tape 800.

The first pinch roller 230 is a roller structure that cooperates with the first drive roller 210 to clamp the material tape 800. The first pinch roller 230 can convey the material tape 800 in conjunction with the first drive roller 210.

The second pinch roller 240 is a roller structure that cooperates with the second drive roller 220 to clamp the material tape 800. The second pinch roller 240 may convey the material tape 800 in conjunction with the second drive roller 220.

The first pinch roller 230 is provided to cooperate with the first drive roller 210 to convey the material tape 800, and the material tape 800 is clamped between the first pinch roller 230 and the first drive roller 210, so that slipping of the material tape 800 can be avoided. The second pinch roller 240 is provided to cooperate with the second drive roller 220 to convey the material tape 800, and the material tape 800 is clamped between the second pinch roller 240 and the second drive roller 220, so that slipping of the material tape 800 can be avoided.

In some embodiments, the second drive roller 220 and the measurement mechanism 300 are connected in communication, and the measurement mechanism 300 measures the dimensions of the tensioned area 810 in response to the second drive roller 220.

"The measurement mechanism 300 measures the size of the tensioned area 810 in response to the second drive roller 220" means that the measurement mechanism 300 starts measuring the size of the tensioned area 810 when the second drive roller 220 moves. For example, the driving member of the second drive roller 220 has a built-in encoder, the encoder being communicatively connected to the measurement mechanism 300. When the encoder starts to act, the measurement mechanism 300 also starts to measure the size of the tensioned area 810.

When the second drive roller 220 starts to move, the measurement mechanism 300 also starts to measure the size of the tensioned area 810 in response to the movement of the second drive roller 220, so that there is no need to start the measurement mechanism 300 separately, and the degree of automation of the measurement device 10 is increased.

In some embodiments, the measurement device 10 further includes a detection unit 500. The detection unit 500 is configured to detect the tensioning force of the tensioned area 810, and the adjustment mechanism 200 responds to detection results of the detection unit 500.

"The adjustment mechanism 200 responds to detection results of the detection unit 500" means that the adjustment mechanism 200 adjusts the tensioning force of the tensioned area 810 according to the detection results of the detection unit 500. The adjustment mechanism 200 may be controlled by the controller to adjust the tensioning force in response to the detection results of the detection unit 500, or may be controlled directly by the detection unit 500 to adjust the tensioning force.

The detection unit 500 is provided to detect the tensioning force of the tensioned area 810, the adjustment mechanism 200 may further adjust the tensioning force of the tensioned area 810 according to the detection results of the detection unit 500, keeping the tensioning force of the tensioned area 810 below the preset tensioning force. In this way, the detection unit 500 and the adjustment mechanism 200 realize feedback adjustment, which helps to improve the accuracy of the measurement mechanism 300 in detecting the material tape 800.

Figure 9:
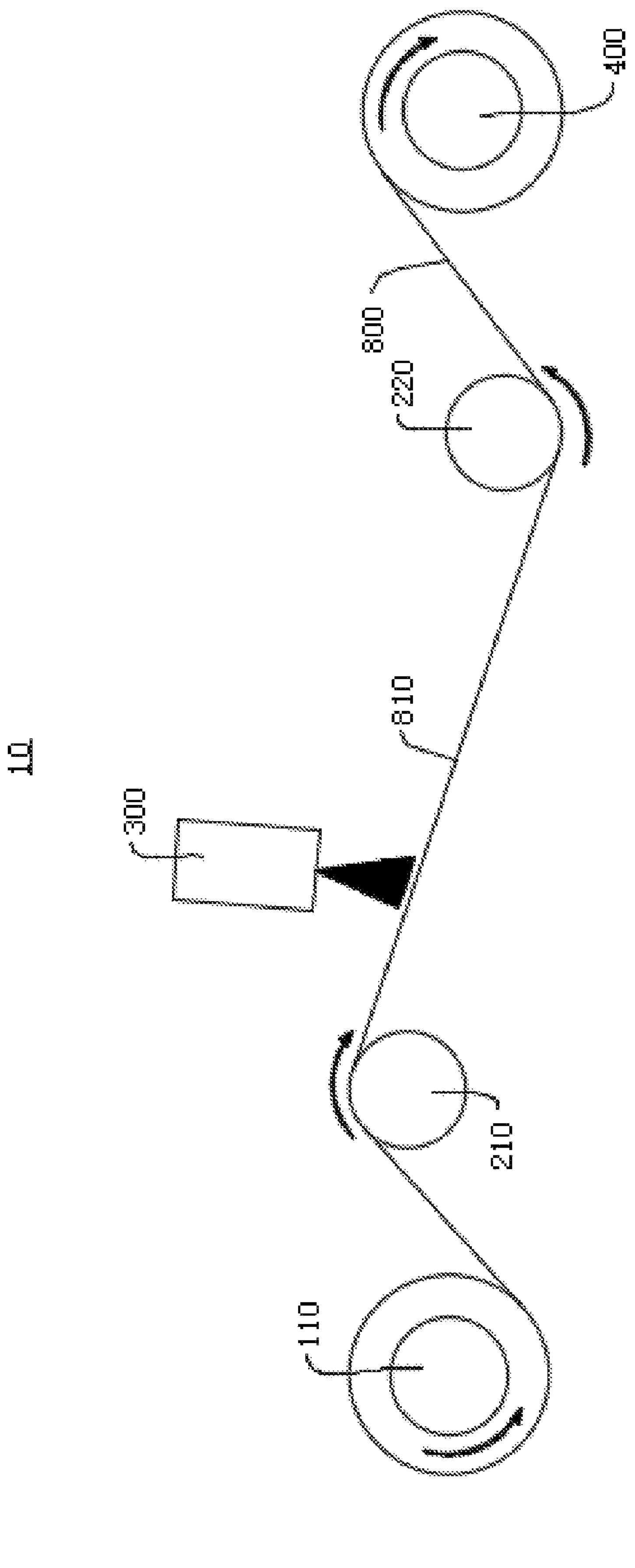
FIG. 9 is a schematic diagram of a measurement device (active unwinding) according to some embodiments of the present application.
Figure 10:
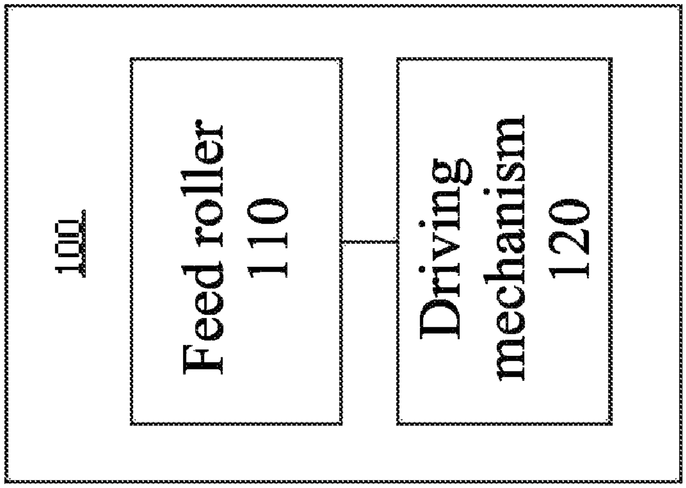
FIG. 10 is a block diagram of an unwinding mechanism according to some embodiments of the present application.

Referring to FIGS. 9 and 10, FIG. 9 is a schematic diagram of a measurement device 10 (active winding) according to some embodiments of the present application. FIG. 10 is a block diagram of an unwinding mechanism 100 according to some embodiments of the present application. In some embodiments, the unwinding mechanism 100 includes a feed roller 110 and a driving mechanism 120, the material tape 800 being wound around the feed roller 110. The driving mechanism 120 is connected to the feed roller 110 and the driving mechanism 120 is configured to drive the feed roller 110 to rotate to unwind the material tape 800.

The feed roller 110 is a roller structure around which the material tape 800 is wound. The driving mechanism 120 is a power mechanism for driving the feed roller 110 to rotate. The driving mechanism 120 may be an electric motor, an internal combustion engine, etc. For example, the driving mechanism 120 is an electric motor, and an output end of the electric motor is connected to the feed roller 110 to drive the feed roller 110 to rotate. The driving mechanism 120 may also include a linear driving member and a transmission mechanism, the linear driving member outputting linear motion and the transmission mechanism converting the linear motion into rotational motion to drive the feed roller 110 to rotate. The linear driving member includes, but is not limited to, an air cylinder, an electric cylinder and a hydraulic cylinder. The transmission mechanism may be a crank slider mechanism, a cam mechanism, etc.

The driving mechanism 120 is provided to drive the feed roller 110 to rotate to achieve active unwinding of the material tape 800.

Figure 11:
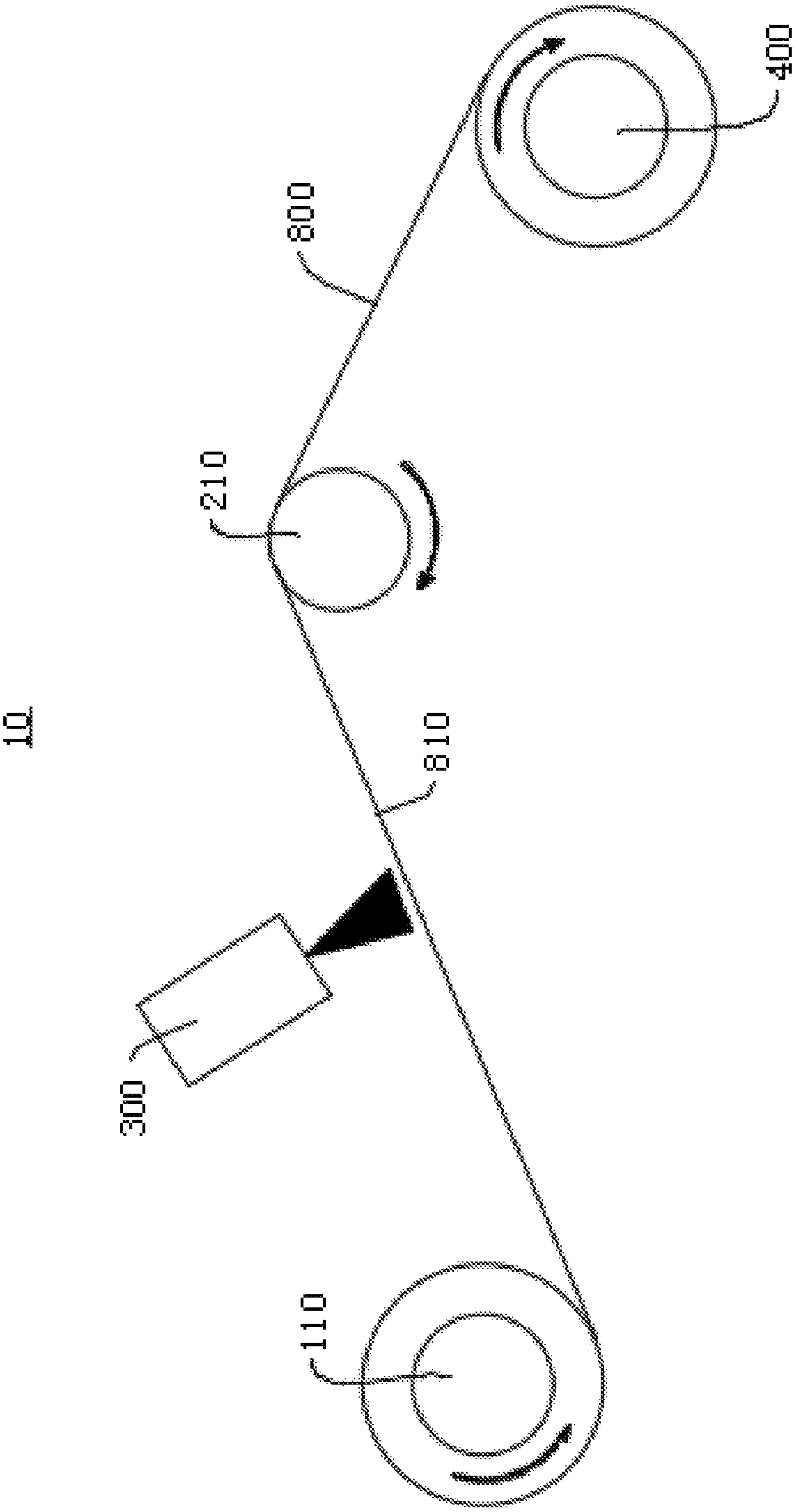
FIG. 11 is a schematic diagram of a measurement device according to some other embodiments of the present application.

Referring to FIG. 11, FIG. 11 is a schematic diagram of a measurement device 10 according to some other embodiments of the present application. In some other embodiments, the adjustment mechanism 200 includes a first drive roller 210, the material tape 800 being wound on the first drive roller 210. The part of the material tape 800 located between the first drive roller 210 and the feed roller 110 forms the tensioned area 810.

The driving mechanism 120 can drive the feed roller 110 to unwind, the first drive roller 210 can drive the material tape 800 to move, and the tensioning force of the material tape 800 can be adjusted by adjusting an unwinding speed of the feed roller 110 and a material tape 800 conveying speed of the first drive roller 210. For example, the feed roller 110 and the first drive roller 210 have the same roller diameter, the feed roller 110 can unwind the material tape 800, and the first drive roller 210 can convey the unwound material tape 800 further toward the winding mechanism 400. If a rotational speed of the first drive roller 210 is greater than a rotational speed of the feed roller 110, the first drive roller 210 can convey the material tape 800 to the winding mechanism 400 faster, causing the amount of material tape 800 unwound by the feed roller 110 to be less than the amount that can be conveyed by the first drive roller 210, and the part of the material tape 800 located between the feed roller 110 and the first drive roller 210 is tensioned to form the tensioned area 810. As a rotational speed difference between the first drive roller 210 and the feed roller 110 increases, the material tape 800 becomes tighter, and the material tape 800 is subjected to a higher tensioning force. Accordingly, the first drive roller 210 can adjust the tensioning force of the material tape 800 and keep the material tape 800 under a preset tensioning force, thus the measurement mechanism 300 measures the size of the material tape 800 more accurately.

In some embodiments, the measurement device 10 further includes the detection unit 500. The detection unit 500 is configured to detect a tensioning force in the tensioned area 810. The first drive roller 210 and the driving mechanism 120 respond to detection results of the detection unit 500.

The detection unit 500 is a component for detecting the tensioning force of the tensioned area 810. The detection unit 500 may be communicatively connected to the first drive roller 210 and the driving mechanism 120, including the detection unit 500 being connected to the first drive roller 210 and the driving mechanism 120 by means of a wired connection such as a wire, and a network cable, and also including the detection unit 500 being connected to the first drive roller 210 and the driving mechanism 120 by means of a wireless connection such as Bluetooth, and a wireless network. The communication connection may refer to that the detection unit 500 is directly connected to the first drive roller 210 and the driving mechanism 120, or may be that the detection unit 500 is indirectly connected to the first drive roller 210 and the driving mechanism 120 through some intermediate component. For example, the intermediate component may be a controller, the detection unit 500 is electrically connected to the controller, the controller is electrically connected to the first drive roller 210 and the driving mechanism 120, and the controller receives the detection results from the detection unit 500 and controls the first drive roller 210 and the driving mechanism 120 to adjust the tensioning force of the tensioned area 810 based on the detection results.

The detection unit 500 is provided to detect the tensioning force of the tensioned area 810, the first drive roller 210 and the driving mechanism 120 may further adjust the tensioning force of the tensioned area 810 according to the detection results of the detection unit 500, keeping the tensioning force of the tensioned area 810 below the preset tensioning force. In this way, the detection unit 500, the first drive roller 210 and the driving mechanism 120 realize feedback adjustment, which helps to improve the accuracy of the measurement mechanism 300 in detecting the material tape 800.

Figure 12:
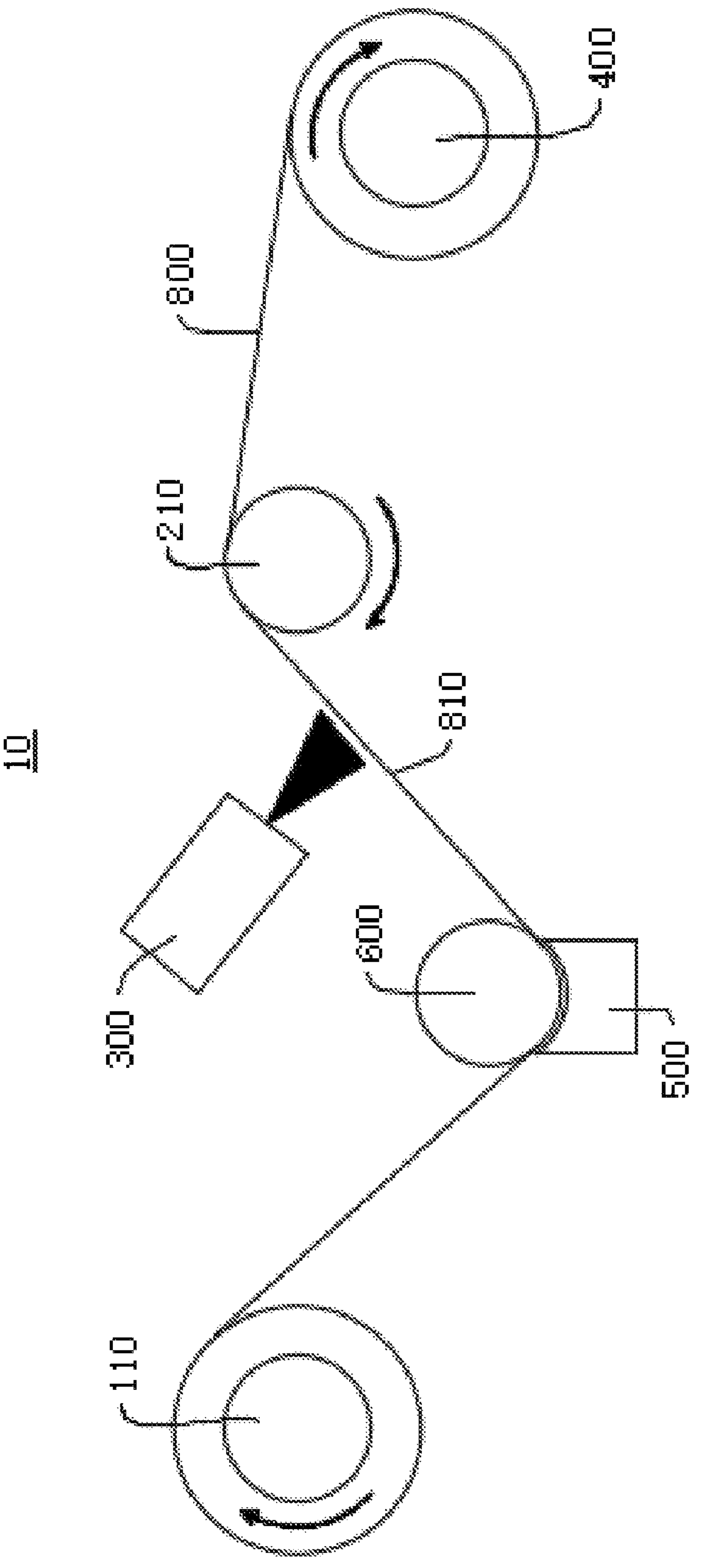
FIG. 12 is a schematic diagram of a measurement device (including a detection unit) according to some other embodiments of the present application.

Referring to FIG. 12, FIG. 12 is a schematic diagram of a measurement device 10 (including a detection unit 500) according to some other embodiments of the present application. In some other embodiments, the measurement unit 10 includes a first tension roller 600, the material tape 800 being sequentially wound around the first tension roller 600 and the first drive roller 210. The detection unit 500 includes a pressure sensor 510 and a calculation unit 520, the pressure sensor 510 being configured to measure a pressure applied to the first tension roller 600 by the material tape 800. The pressure sensor 510 is communicatively connected to the calculation unit 520. The calculation unit 520 is configured to calculate the tensioning force of the material tape 800 according to detection results of the pressure sensor 510.

The first tension roller 600 is a roller structure for tensioning the material tape 800. Along a conveying direction of the material tape 800, the first tension roller 600 is located between the feed roller 110 and the first drive roller 210, so that the material tape 800 can be sequentially wound around the first tension roller 600 and the first drive roller 210.

The pressure sensor 510 is provided to measure the pressure applied to the first tension roller 600 by the material tape 800. The pressure applied on the first tension roller 600 by the material tape 800 may be considered as a resultant force of two component forces (tensioning forces) of the material tape 800 on both sides of the tension roller. Accordingly, the calculation unit 520 may calculate the component forces (tensioning forces) on the basis of the pressure applied to the first tension roller 600 by the material tape 800 and an angle between each of two component forces and the pressure. As the detection unit 500 is used for measuring the tensioning force, the measuring results are accurate and the cost is low.

Figure 13:
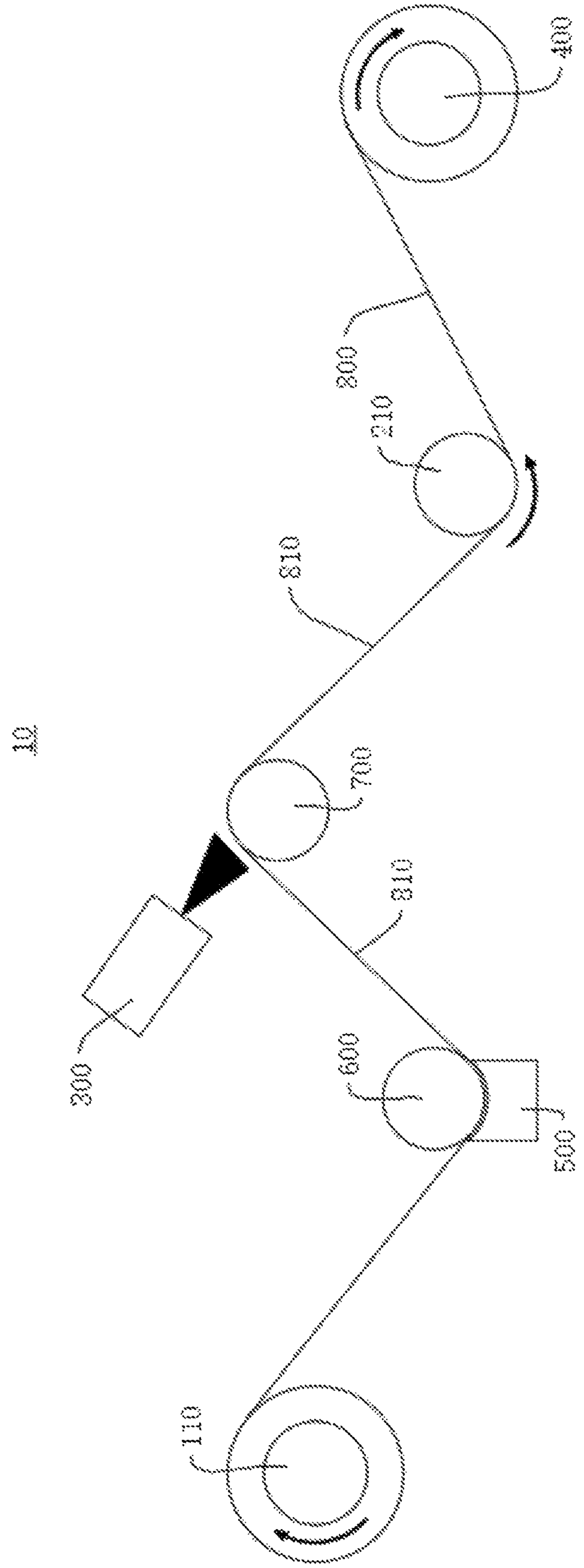
FIG. 13 is a schematic diagram of a measurement device (including a second tension roller) according to some other embodiments of the present application.

Referring to FIG. 13, FIG. 13 is a schematic diagram of a measurement device 10 (including a second tension roller 700) according to some other embodiments of the present application. In some other embodiments, the measurement device 10 includes the second tension roller 700, the material tape 800 being sequentially wound around the second tension roller 700 and the first drive roller 210. The measurement mechanism 300 and the second tension roller 700 are arranged opposite each other on two sides in a thickness direction of the material tape 800 so that the measurement mechanism 300 measures the size of the part of the material tape 800 wound on the second tension roller 700.

The second tension roller 700 is a roller structure for tensioning the material tape 800. Along a conveying direction of the material tape 800, the second tension roller 700 is located between the feed roller 110 and the first drive roller 210, so that the material tape 800 can be sequentially wound around the second tension roller 700 and the first drive roller 210.

Both the first tension roller 600 and the second tension roller 700 are located between the feed roller 110 and the first drive roller 210 along the conveying direction of the material tape 800. The order of the first tension roller 600 and the second tension roller 700 is not limited. The first tension roller 600 may be located between the feed roller 110 and the second tension roller 700, or between the first drive roller 210 and the second tension roller 700. As shown in FIG. 13, the second tension roller 700 is located downstream of the first tension roller 600 and upstream of the first drive roller 210. The material tape 800 is sequentially wound around the first tension roller 600, the second tension roller 700 and the first drive roller 210.

The second tension roller 700 can support the material tape 800, the measurement mechanism 300 detects the part wound on the second tension roller 700, so that the material tape 800 is less prone to shaking, making the measuring results more accurate, which is conducive to controlling the production quality of the material tape 800 accordingly, thereby improving the yield of the material tape 800.

In some embodiments, the measurement mechanism 300 is an industrial camera.

The industrial camera is capable of acquiring images of the tensioned area 810 and processing the images to obtain the size of the material tape 800.

The industrial camera is chosen as the measurement mechanism 300, which is accurate and reliable, and does not need to touch the material tape 800 when measuring, so it will not damage the material tape 800.

In some other embodiments, the measurement mechanism 300 may also be a scanner.

Figure 14:
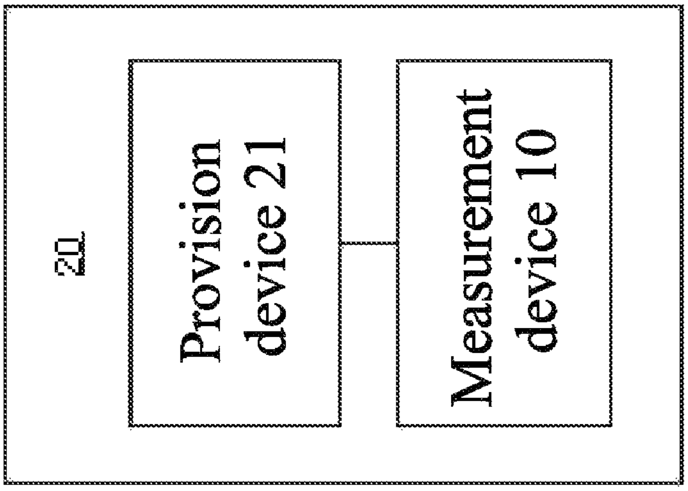
FIG. 14 is a block diagram of an electrode plate production system according to some embodiments of the present application.

Referring to FIG. 14, FIG. 14 is a block diagram of an electrode plate production system 20 according to some embodiments of the present application. Embodiments of the present application further provide an electrode plate production system 20. The electrode plate production system 20 includes a provision device 21 and the measurement device 10 described above. The provision device 21 is configured to provide an electrode plate; and the measurement device 10 is configured to measure the size of the tensioned area 810.

According to some embodiments of the present application, reference is made to FIGS. 1 to 8.

Embodiments of the present application provide a measurement device 10. The measurement device 10 includes an unwinding mechanism 100, an adjustment mechanism 200, a measurement mechanism 300 and a winding mechanism 400. The unwinding mechanism 100 is configured to unwind a material tape 800. The adjustment mechanism 200 is arranged downstream of the unwinding mechanism 100. The adjustment mechanism 200 includes a first drive roller 210 and a second drive roller 220, the material tape 800 being wound around the first drive roller 210 and the second drive roller 220. The first drive roller 210 and the second drive roller 220 are configured to cooperate to adjust a tensioning force of the material tape 800 so that the part of the material tape 800 located between the first drive roller 210 and the second drive roller 220 forms a tensioned area 810. The measurement mechanism 300 is configured to measure the size of the tensioned area 810. The winding mechanism 400 is arranged downstream of the adjustment mechanism 200. The winding mechanism 400 is configured to wind up the material tape 800.

The measurement device 10 further includes a detection unit 500. The detection unit 500 is configured to detect a tensioning force of the tensioned area 810, and the first drive roller 210 and the second drive roller 220 respond to detection results of the detection unit 500.

The unwinding mechanism 100 and the winding mechanism 400 of the measurement device 10 cooperate to achieve conveying of the material tape 800. The adjustment mechanism 200 of the measurement device 10 can adjust the tensioning force of the material tape 800 and keep the material tape 800 under a preset tensioning force, so that the material tape 800 maintains a specific and constant amount of deformation, and thus the measurement mechanism 300 measures the size of the material tape 800 more accurately. Measuring results of the measurement device 10 can provide an accurate feedback on the size of the material tape 800, which is conducive to controlling the production quality of the material tape 800 accordingly, thereby improving the yield of the material tape 800. Both the first drive roller 210 and the second drive roller 220 can drive the material tape 800 to move, and the tensioning force of the material tape 800 can be adjusted by adjusting material tape 800 conveying speeds of the first drive roller 210 and the second drive roller 220. For example, the first drive roller 210 and the second drive roller 220 have the same roller diameter, the first drive roller 210 can backwards convey the material tape 800 unwound by the unwinding mechanism 100, and the second drive roller 220 can convey the material tape 800 conveyed by the first drive roller 210 further toward the winding mechanism 400. If a rotational speed of the second drive roller 220 is greater than a rotational speed of the first drive roller 210, the second drive roller 220 can convey the material tape 800 to the winding mechanism 400 faster, causing the amount of material tape 800 fed to the second drive roller 220 by the first drive roller 210 to be less than the amount that can be conveyed by the second drive roller 220, and the part of the material tape 800 located between the first drive roller 210 and the second drive roller 220 is tensioned to form the tensioned area 810. As a rotational speed difference between the second drive roller 220 and the first drive roller 210 increases, the material tape 800 becomes tighter, and the material tape 800 is subjected to a higher tensioning force. Accordingly, the first drive roller 210 and the second drive roller 220 can adjust the tensioning force applied to the material tape 800 and keep the material tape 800 under a preset tensioning force, thus the measurement mechanism 300 measures the size of the material tape 800 more accurately.

The detection unit 500 is provided to detect the tensioning force of the tensioned area 810, the first drive roller 210 and the second drive roller 220 may further adjust the tensioning force of the tensioned area 810 according to the detection results of the detection unit 500, keeping the tensioning force of the tensioned area 810 below the preset tensioning force. In this way, the detection unit 500, the first drive roller 210 and the second drive roller 220 realize feedback adjustment, which helps to improve the accuracy of the measurement mechanism 300 in detecting the material tape 800.

The foregoing descriptions are merely preferred embodiments of the present application, but are not intended to limit the present application. For those skilled in the art, the present application may have various modifications and variations. Any modifications, equivalent substitutions, improvements, and the like made within the spirit and principle of the present application should fall within the scope of protection of the present application.

The invention claimed is:

1. A measurement device, comprising:

an unwinding mechanism to unwind a material tape;

an adjustment mechanism arranged downstream of the unwinding mechanism to adjust a tensioning force of the material tape so that the material tape forms a tensioned area;

a measurement mechanism to measure a size of the tensioned area; and a winding mechanism arranged downstream of the adjustment mechanism to wind up the material tape, wherein the adjustment mechanism includes an upstream roller and a downstream roller to convey the material tape, and a downstream rotational speed of the downstream roller is greater than an upstream rotational speed of the upstream roller such that the tensioned area is formed between the upstream roller and the downstream roller.

2. The measurement device according to claim 1, wherein:

the adjustment mechanism comprises a first drive roller corresponding to the upstream roller and a second drive roller corresponds to the downstream roller, the material tape is wound around the first drive roller and the second drive roller, and a part of the material tape located between the first drive roller and the second drive roller forms the tensioned area.

3. The measurement device according to claim 2, further comprising:

a detector to detect a tensioning force of the tensioned area, wherein the first drive roller and the second drive roller respond to detector results of the detector.

4. The measurement device according to claim 3, further comprising:

a first tension roller, the material tape being sequentially wound around the first drive roller, the first tension roller, and the second drive roller; and wherein the detector comprises a pressure sensor and a calculator, the pressure sensor to measure a pressure applied to the first tension roller by the material tape and being communicatively connected to the calculator, and the calculator to calculate the tensioning force of the material tape according to detector results of the pressure sensor.

5. The measurement device according to claim 2, further comprising:

a second tension roller, the material tape being sequentially wound around the first drive roller, the second tension roller, and the second drive roller; and wherein the measurement mechanism and the second tension roller are arranged opposite each other on two sides in a thickness direction of the material tape so that the measurement mechanism measures the size of the part of the material tape wound on the second tension roller.

6. The measurement device according to claim 2, wherein:

the adjustment mechanism further comprises a first pinch roller, the first pinch roller and the first drive roller being arranged on two sides in a thickness direction of the material tape, and the first pinch roller and the first drive roller cooperating to convey the material tape; and/or the adjustment mechanism further comprises a second pinch roller, the second pinch roller and the second drive roller being arranged on two sides in the thickness direction of the material tape, and the second pinch roller and the second drive roller cooperating to convey the material tape.

7. The measurement device according to claim 2, wherein:

the second drive roller is communicatively connected to the measurement mechanism, and the measurement mechanism measures the size of the tensioned area in response to the second drive roller.

8. The measurement device according to claim 1, further comprising:

a detector to detect a tensioning force of the tensioned area, wherein the adjustment mechanism responds to detector results of the detector.

9. The measurement device according to claim 1, wherein the unwinding mechanism comprises:

a feed roller corresponding to the upstream roller, around which the material tape is wound; and a driving mechanism connected to the feed roller to drive the feed roller to rotate to unwind the material tape.

10. The measurement device according to claim 9, wherein:

the adjustment mechanism comprises a first drive roller corresponding to the downstream roller, the material tape is wound on the first drive roller, and a part of the material tape located between the first drive roller and the feed roller forms the tensioned area.

11. The measurement device according to claim 10, further comprising:

a detector to detect a tensioning force of the tensioned area, wherein the first drive roller and the driving mechanism respond to detector results of the detector.

12. The measurement device according to claim 11, further comprising:

a first tension roller, the material tape being sequentially wound around the first tension roller and the first drive roller; and wherein the detector comprises a pressure sensor and a calculator, the pressure sensor measures a pressure applied to the first tension roller by the material tape and being communicatively connected to the calculator, and the calculator calculates the tensioning force of the material tape according to detector results of the pressure sensor.

13. The measurement device according to claim 10, further comprising:

a second tension roller, the material tape being sequentially wound around the second tension roller and the first drive roller; and wherein the measurement mechanism and the second tension roller are arranged opposite each other on two sides in a thickness direction of the material tape so that the measurement mechanism measures the size of the part of the material tape wound on the second tension roller.

14. The measurement device according to claim 1, wherein:

the measurement mechanism is an industrial camera.

15. An electrode plate production system comprising:

a provision device to provide an electrode plate; and a measurement device including:

an unwinding mechanism to unwind a material tape;

an adjustment mechanism arranged downstream of the unwinding mechanism to adjust a tensioning force of the material tape so that the material tape forms a tensioned area;

a measurement mechanism to measure a size of the tensioned area; and a winding mechanism arranged downstream of the adjustment mechanism to wind up the material tape, wherein the adjustment mechanism includes an upstream roller and a downstream roller to convey the material tape, a downstream rotational speed of the downstream roller is greater than an upstream rotational speed of the upstream roller such that the tensioned area is formed between the upstream roller and the downstream roller, and the measurement device measures the size of the tensioned area.

16. The measurement device according to claim 1, wherein:

the tensioning force of the material tape in the tensioned area is increased between the upstream roller and the downstream roller by an increase in a rotational speed difference between the downstream rotational speed and the upstream rotational speed.

17. The measurement device according to claim 16, wherein:

the downstream rotational speed is greater than the upstream rotational speed such that an amount of the material tape fed to the downstream roller by the upstream roller is less than an amount of the material tape that is conveyable by the downstream roller, thereby maintaining the material tape in the tensioned area below a preset tensioning force.

18. The measurement device according to claim 17, further comprising:

a detector to detect the tensioning force of the tensioned area, wherein the downstream rotational speed of the downstream roller is adjusted in response to detector results of the detector to maintain the tensioning force of the tensioned area at the preset tensioning force.

19. The measurement device according to claim 18, wherein:

the downstream roller is adjusted in response to detector results of the detector to maintain the material tape at a constant amount of deformation to enable the measurement mechanism to measure the size of the material tape.

20. A measurement device, comprising:

an unwinding mechanism to unwind a material tape;

an adjustment mechanism arranged downstream of the unwinding mechanism to adjust a tensioning force of the material tape so that the material tape forms a tensioned area;

a measurement mechanism to measure a size of the tensioned area;

a winding mechanism arranged downstream of the adjustment mechanism to wind up the material tape; and a detector to detect the tensioning force of the tensioned area, wherein the adjustment mechanism includes an upstream roller and a downstream roller to convey the material tape, a downstream rotational speed of the downstream roller is greater than an upstream rotational speed of the upstream roller such that the tensioned area is formed between the upstream roller and the downstream roller, the tensioning force of the material tape in the tensioned area is increased between the upstream roller and the downstream roller by an increase in a rotational speed difference between the downstream rotational speed and the upstream rotational speed, the downstream rotational speed is greater than the upstream rotational speed such that an amount of the material tape fed to the downstream roller by the upstream roller is less than an amount of the material tape that is conveyable by the downstream roller, thereby maintaining the material tape in the tensioned area below a preset tensioning force, and the downstream rotational speed of the downstream roller is adjusted in response to detector results of the detector to maintain the tensioning force of the tensioned area at the preset tensioning force.

* * * * *